United States Patent [19]

Rogers et al.

[11] 3,920,524

[45] Nov. 18, 1975

[54] METHOD FOR HIGH SPEED CONTINUOUS ELECTROPLATING USING PLATINUM CLAD ANODE ASSEMBLY

[75] Inventors: Orris A. Rogers, Woodbury; Eldridge K. Camp, Northfield; John P. Borgmann, Naugatuck, all of Conn.

[73] Assignee: American Chemical & Refining Company, Inc., Waterbury, Conn.

[22] Filed: Nov. 12, 1974

[21] Appl. No.: 523,126

Related U.S. Application Data

[62] Division of Ser. No. 308,478, Nov. 21, 1972, Pat. No. 3,856,653.

[52] U.S. Cl. ............................ 204/28; 204/28 X
[51] Int. Cl.² .................. C25D 7/06; C25D 5/04
[58] Field of Search ........................... 204/28, 206

[56] References Cited
UNITED STATES PATENTS

| | | | |
|---|---|---|---|
| 3,658,664 | 4/1972 | Swalheim | 204/28 X |
| 3,751,344 | 8/1973 | Angelini | 204/28 |

*Primary Examiner*—G. L. Kaplan

[57] ABSTRACT

A platinum-clad tantalum anode assembly includes a tantalum mesh having platinum-cladding on the surface thereof to be disposed adjacent the workpiece, a conductive framework disposed adjacent the other surface of the tantalum mesh, and an electrical distribution subassembly. The framework includes a plurality of elongated tantalum frame members conductively bonded to the mesh and transverse tantalum frame members extending perpendicularly thereto. The electrical distribution subassembly includes at least one elongated bus member extending generally parallel to the elongated frame members and at least one transverse bus member extending generally perpendicular thereto. At least one of the transverse bus members is disposed intermediate the ends of the elongated frame members and conductively bonded on one surface thereof to the elongated bus member and on the other surface thereof to the elongated frame members. The bus members are free from electrical contact with the framework and mesh except for the conductive path provided by the bonds between the transverse bus member and the elongated frame members, and the bonds are resistant to corrosive action by a bath in which the assembly may be disposed.

The assembly is useful in the high speed continuous electroplating of carbon steel and other substrates with various metals such as tin and chromium.

6 Claims, 8 Drawing Figures

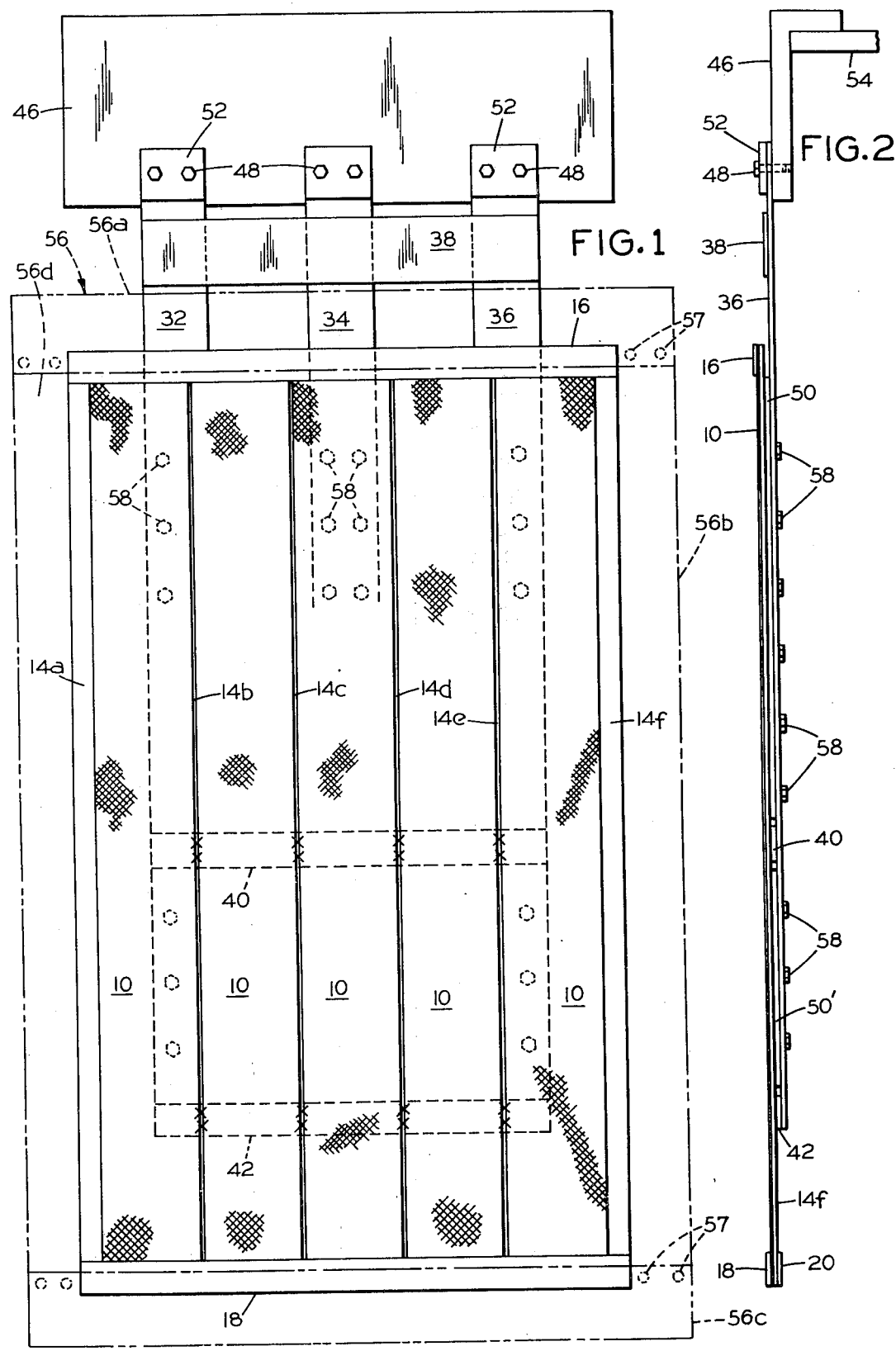

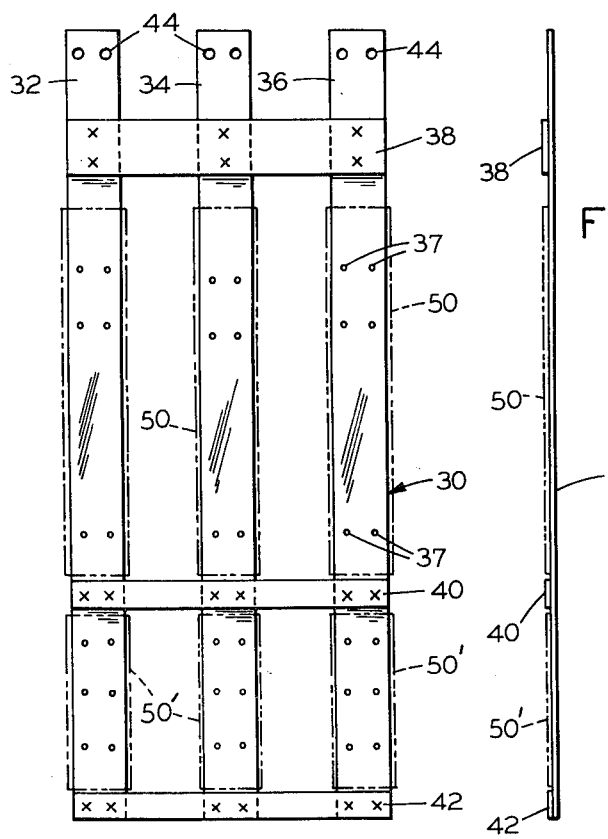
FIG.3
FIG.4
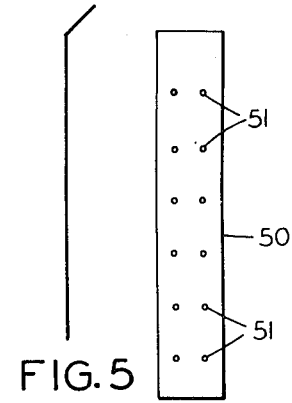
FIG.5
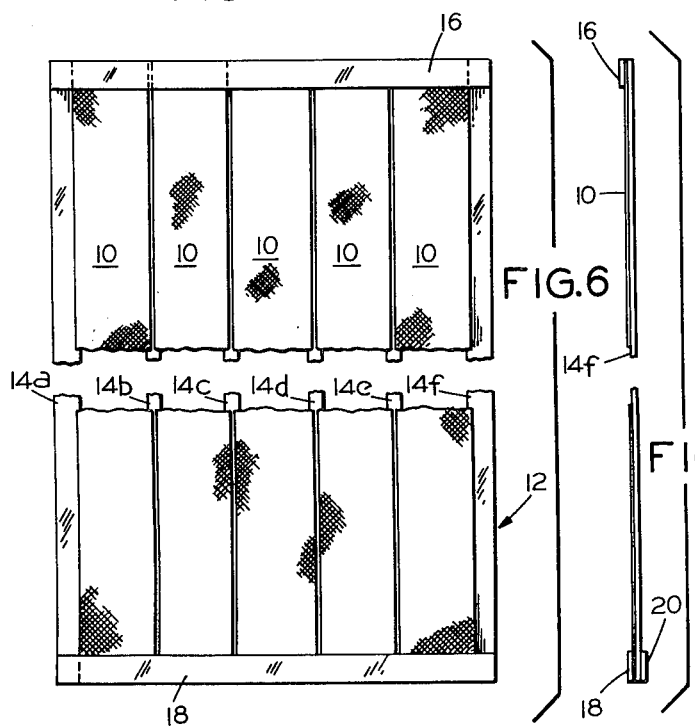
FIG.6
FIG.7
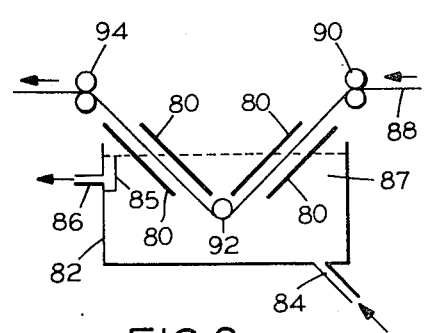
FIG.8

METHOD FOR HIGH SPEED CONTINUOUS ELECTROPLATING USING PLATINUM CLAD ANODE ASSEMBLY

The present application is a divisional of U.S. application Ser. No. 308,478 filed Nov. 21, 1972, by the inventors herein, now U.S. Pat. No. 3,856,653.

BACKGROUND OF THE INVENTION

Large metallic anodes for use in the tin and chromium plating of carbon steel strips on high speed continuous lines have been fabricated from a variety of different materials including solid tin, lead, stainless steel and platinized titanium. Corrosion of the current-carrying anode results in the need for periodic replacement of the solid tin anode at all too frequent intervals. Stainless steel anodes have displayed poor electrical properties and in various baths are somewhat susceptible both to corrosive attack and the formation of inert coatings on the anode which further reduce utility. The platinized titanium anode exhibits a short useful life as discontinuities and pinholes in the platinum coating permit destruction of the anode through corrosive attack on the titanium base. The magnitude of the problem becomes readily apparent when one learns that the platinized titanium anode life in full production operation in high speed baths may be less than 25 days and the replacement cost thereof may be many thousand of dollars.

Among the most important criteria to be considered in selection of an appropriate anode is the ability of the anode to operate so as to provide relatively high current densities for high electroplating speed and to provide fairly uniform current distribution over its active surface to ensure uniformity of electrodeposits on the workpiece. To obtain high current densities a series of electroplating tanks each containing short anodes often has been used rather than a single elongated anode providing the desired plating distance. To achieve uniformity of electrodeposits, the anode to cathode distance has been varied over the length of the plating path to compensate for the gradient in current distribution over the surface of the anode; this is an expediency which compensates for, but does not solve, the problem of maintaining a uniform current distribution over the working anode surface.

An additional problem encountered in providing the large elongated anodes desired for use on high speed continuous electroplating lines has been the lack of rigidity in noble metal anode screens or mesh and other lightweight structures. Attempts to minimize "waving" by providing physical support by frames have tended to impede a desirably high electroplating solution flow, while the use of mesh anodes to reduce resistance to solution flow has merely increased the problem of "waving" due to the flexibility of the mesh.

Accordingly, it is an object of the present invention to provide a novel method for high speed electroplating using an anode assembly resistant to corrosive attack on the operating surface and providing substantially uniform current distribution over the surface thereof.

It is also an object to provide such a method which will avoid spurious electrical conduction into the bath.

Still another object is to provide a method wherein the anode assembly exhibits a life in full production operation of at least 3 months and which permits operation at current densities on workpiece as high as 30 kiloamperes per square meter.

A further object is to provide a method wherein a variation in current distribution from point to point over the anode is less than twenty per cent.

SUMMARY OF THE INVENTION

It has been found that the foregoing and related objects may be readily attained by a method in which there is used a platinum-clad tantalum anode assembly which has a tantalum mesh having platinum cladding on one surface thereof, and a conductive framework disposed adjacent to the other surface. The framework includes a plurality of elongated frame members and transverse frame members extending perpendicularly thereto, the frame members being fabricated of tantalum and the mesh being bonded to the elongated frame members to provide electrical connection therebetween resistant to corrosive action by a bath in which the assembly may be disposed.

The assembly further provides a current distribution subassembly having at least one elongated bus member extending generally parallel to the elongated frame members and at least one transverse bus member extending generally perpendicular thereto and disposed intermediate the ends of the elongated frame members. The transverse bus member is bonded on one surface thereof to the elongated bus member and on the other surface thereof to the elongated frame members to provide electrical connection therebetween resistant to corrosive action by a bath in which the assembly may be disposed. The bus members are free from electrical contact with the framework except through the conductive paths provided by the bonds between the transverse bus members and the elongated frame members.

Preferably a plurality of elongated and transverse bus members are provided, all fabricated of tantalum, with at least a plurality of the transverse bus members being disposed intermediate the ends of the elongated frame members so that current may be selectively applied at a plurality of points intermediate the length of the framework. The transverse frame members are preferably disposed adjacent the ends of the elongated frame members and bonded thereto to provide rigidity. In a preferred embodiment the mesh is comprised of a plurality of strips with at least two of the mesh strips being bonded to one elongated frame member.

The method permits the high speed continuous electroplating of an elongated workpiece within an electroplating tank adapted to permit the flow therethrough of electroplating solution and the movement therethrough of an elongated workpiece. An electroplating solution containing ions of a metal to be plated and an electrolyte is circulated through the electroplating tank while the elongated workpiece is rapidly transported through the electroplating solution within the electroplating tank.

Maintained adjacent the workpiece within the electroplating solution is at least one anode assembly of the present invention. A potential is applied between the workpiece and the anode assembly to provide a uniform current distribution with variations of less than 20 per cent across the mesh surface and to thereby electroplate the metal ion of the electroplating solution onto the workpiece.

The workpiece is preferably transported through the electroplating solution at a rate of about 90 to 1000 meters per minute. The potential applied is adjusted preferably to about 5 to 25 volts with the current density being maintained at about 0.2 to 30 kiloamperes per square meter. The electroplating solution, which is maintained at about 45° to 50°C, is preferably composed of tin and/or chrome metallic ions and an aryl sulfonic acid, sulfate salt and/or chromate salt electrolyte. The preferred aryl sulfonic acid conductor salts are ethoxylated naphthol sulfonic acid and dihydroxy di-phenyl sulfonic acid.

DESCRIPTION OF THE DRAWINGS

FIG. 1 is a front elevational view of platinum-clad tantalum anode assembly for the method embodying the present invention, with a reinforcing frame shown in phamtom line;

FIG. 2 is a side elevational view of the anode assembly shown in FIG. 1;

FIG. 3 is a front elevational view to a reduced scale of the electrical current distribution subassembly with the insulator strips shown in phantom line;

FIG. 4 is a side elevational view of the subassembly of FIG. 3;

FIG. 5 is a front elevational view of the insulator strips used in the subassembly of FIG. 3;

FIG. 6 is a fragmentary front elevational view to a reduced scale of the mesh and mesh-supporting framework of FIG. 1;

FIG. 7 is a side elevational view of the mesh and framework of FIG. 6; and

FIG. 8 is a schematic view illustrating the use of the anode assemblies of the present invention in an electroplating installation.

DESCRIPTION OF THE PREFERRED EMBODIMENTS

As previously indicated, the platinum-clad tantalum anode assembly is comprised of a platinum-clad tantalum mesh, a conductive framework and an electrical current distribution subassembly of mesh and framework being shown in greater detail in FIGS. 6 and 7 and the current distribution subassembly being shown in detail in FIGS. 3 and 4. For ease of discusssion, the mesh and framework subassembly shown in FIGS. 6 and 7 will first be described.

Referring now to FIGS. 6 and 7, elongated mesh strips 10 are fabricated from a tantalum mesh bearing on one surface a thin platinum cladding. Five of these elongated platinum-clad tantalum mesh strips 10 are supported by the conductive structural framework generally designated by the numeral 12 and which includes six elongated tantalum frame members 14a–14f and two transverse tantalum frame members 16, 18. The platinum-clad tantalum mesh strips 10 extend between and slightly overlap pairs of elongated frame members 14 (for example, one strip 10 between elongated frame members 14a and 14b), and the overlapping areas are welded together. As will be appreciated, the platinum-clad surface of the strips 10 is exposed so that the weld is of tantalum to tantalum to avoid formation of undesirable intermetallic compounds. Strip edge welding is preferably used to preserve full electrical conductivity between the strips 10 and the elongated frame members 14.

Top and bottom transverse frame members 16, 18 are subsequently welded in place over the end portions of mesh strips 10 and frame members 14 to provide an electrically conductive, structurally sound framework for the mesh 10. A thin tantalum strip 20 is also welded to the rear bottom surface of frame members 14, parallel to the transverse frame member 18, to provide additional rigidity to the frame 12. If desired, thin narrow tantalum strips may be welded over the exposed front surfaces of the elongated frame members 14b through 14e and partially overlapping the welded edges of the mesh strips 10 to protect the edges of the exposed mesh strips, to stiffen the frame even further and to provide a more finished appearance.

Turning now to FIGS. 3 and 4, the electrical current distribution subassembly generally designated by the numeral 30 has three elongated bus members 32, 34 and 36 extending generally parallel to the elongated frame members 14 (as illustrated in FIG. 1), and three transverse bus members 38, 40 and 42 extending generally perpendicular to the elongated bus members. The transverse bus members 38, 40, 42 are conductively bonded or welded onto the surface of the elongated bus members 32, 34, 36 adjacent the framework 12. Welds have been made at each point of intersection although, in other embodiments where a different current distribution may be desired, one or more points of intersection between the elongated and transverse bus members may be insulated to avoid conductive action. The welded busbars provide a rigid electrical network adapted to carry current substantially uniformly to points spaced therealong. Each of the elongated busbars 32, 34, 36 is provided with a pair of apertures 44 adjacent the upper end thereof for a purpose to be described hereinafter.

As illustrated, the transverse bus member 38 is disposed above the framework 12 and will in operation be above the level of the electroplating solution; its purpose is to ensure uniformity of current distribution through the several elongated bus members 32, 34, 36 and to avoid arcing therebetween. The transverse bus members 40, 42 are bonded to the framework 12 as will be discussed more in detail hereinafter.

As seen in FIGS. 3–5, the faces of the elongated bus members 32, 34, 36 adjacent the framework 12 have mounted thereon synthetic plastic insulator strips 50, 50' which extend between framework 12 and electrical current distribution subassembly except in the areas of the transverse bus members 40, 42. As can be seen, the elongated bus members 32, 34, 36 are provided with a multiplicity of apertures 37 which cooperate with similar apertures 51 in the insulating strips 50, 50' so that engagement therebetween may be effected by fasteners 58 seated therein as seen in FIG. 2. These insulator strips 50, 50' preclude arcing between the bus members 32, 34, 36 and the framework 12 and mesh 10 and current flow therebetween through the solution during the initial period of operation of the anode assembly in the electroplating solution. After the anode assembly has been operative in the bath, the exposed surface of the tantalum will develop a non-conductive compound thereon which will effectively preclude such spurious current conduction.

Referring now to FIGS. 1 and 2, it can be seen that the framework 12 is welded to the surface of the electrical current distribution subassembly 30 by locating the transverse bus members 40, 42 intermediate the ends of the elongated frame members 14 and welding them to the back of the elongated frame members 14b through 14e which they contact. The mesh strips 10 may also be welded to the transverse bus members 40, 42 along their opposed surfaces. It will be noted that due to the presence of the insulator strips 50, 50' at initial use of the assembly and to the deactivation of the tantalum surfaces after use of the assembly, the only effective electrical connection between the electrical distribution subassembly 30 and the conductive structural framework 12 is through the transverse bus members 40 and 42 which are located intermediate the ends of the framework 12.

The anode formed by the mesh 10, conductive framework 12 and the electrical current distribution subassembly 30 is mounted upon the main copper bus conductor 46 shown in FIG. 1 by copper bolts 48 passing successively through a protective copper plate 52, the apertures 44 in the upper ends of the elongated bus members 32, 34, 36 and the main copper bus conductor 46. A single copper conductor bar 54 is disposed in conductive contact with the main bus conductor 46 to supply current to the entire anode assembly.

Referring now to FIG. 1, a reinforcing frame generally designated by the numeral 56 (shown in phantom) is preferably constructed about the framework 12 of the anode assembly to facilitate handling and mounting of the assembly to protect the elements of the assembly, and to impart greater rigidity to the assembly. The reinforcing frame 56 is preferably composed of four fiberglass-reinforced synthetic plastic strips 56a, 56b, 56c, 56d which have channels to receive the elongated frame members 14a, 14f and the transverse frame members 16, 18; the strips 56a–56d being held together by fasteners 57. The reinforcing frame 56 is thus securely and removably attached directly to the assembly framework without appreciably impeding solution flow therethrough.

It will be noted that none of the materials used in the construction of the assembly is destructively attacked within the operating limits of the plating bath, but the exposed tantalum surfaces will form a desirable, inert non-conductive compound (possibly tantalum oxide) at the interface with the electroplating bath and this non-conductive compound prevents spurious conduction and consequent loss of control over anode operation. The tantalum has a sufficiently high electrical breakdown potential to accept a process voltage of 25 volts and even higher while maintaing its resistance to chemical attack, and the thermal conductivity of tantalum is high enough to ensure adequate cooling of the assembly by convection and conduction of heat to the electroplating solution. Additional advantages of the use of annealled metallurgical grade tantalum are its relative flexibility and its ability to be strip-edge welded to preserve full electrical conductivity.

Moreover, by having the platinum clad mesh, the platinum surface will provide the desired continued high electrical conductivity and resistance to corrosive attack for extended periods of operation. Even if the cladding develops a pinhole, the thus exposed tantalum will rapidly develop a protective coating.

The overall weight of the assembly (including the anode and the main bus conductor) is extremely light in relation to the overall working anode surface provided. For example, an assembly with an anode surface of 0.8 by 1.5 meters weighs only about 11 kilograms.

The platinum-clad tantalum anode assembly 80 described in detail is particularly useful in the high-speed continuous electroplating of carbon steel strip with tin and chromium. Referring now to FIG. 8, an electroplating tank generally designated by the numeral 82 is equipped with an inlet 84 and an outlet 86 for rapid circulation of an electroplating solution 87 therethrough. A discharge weir 85 controls the level of the solution in the tank 82.

A carbon steel workpiece 88 is guided by means of rolls 90 down into the solution within electroplating tank 82, around roll 92 and back out of the solution through rolls 94. Anode assemblies 80 are disposed in parallel pairs on opposite sides of the travel path of the workpiece 88, with equal lengths of the assemblies being located below the bath level. The upper portion of each assembly 80 (starting with transverse bus member 38 and including all the copper components) is maintained above the level of solution 87 within tank 82, and an electrical potential of about 5 to 25 volts is applied across the workpiece 88 by means of electrical connection to the rolls 90, 94 and to the anode assemblies 80.

As the workpiece 88 passes through the tank 82, current flows through the bath from the anode assemblies 80 to the workpiece 88 through the electroplating solution and causes deposition of the metal onto the surface thereof. The current flow to the anode assembly of the present invention intermediate its operative length ensures substantially uniform flow over the effective plating area and a desirably controlled deposit. The pattern and degree of distribution across the effective plating area is dependent on the number and placement of the transverse bus bars 40, 42 intermediate the ends of the elongated frame members 32, 34, 36. Accordingly, where a uniform current pattern exhibiting a high degree of current distribution is desired, a single transverse bus member may be located about midway along the length of the elongated frame members 32, 34, 36, or a plurality of transverse bus members may be somewhat regularly spaced out along such length.

The low weight of the anode assembly facilitates handling of the assembly for inspection, repair and replacement, while the high mechanical strength of the assembly prevents "waving" of the anode mesh in the bath without undesirably high resistance to solution flow therethrough.

It will be noted that the anode assembly consists essentially of platinum (a highly conductive but chemically resistent anode surface material), tantalum (a strong and highly conductive material which is highly chemically resistant to destructive corrosion), polyproplene (a high-density, heat-resistant plastic useful both as a structural frame member and as electrical insulation), threaded plastic fasteners (such as polypropylene tetrofluoroethylene), fiberglass reinforced plastic (an inert structural backing), and, only above the level of the electroplating solution, copper bus members.

To effect particular current distribution patterns over the anode mesh surface of the assembly, one or more of the areas of intersection between the elongated bus members 32, 34, 36 and the transverse bus members 40, 42 may be non-welded and insulated to prevent current flow therebetween. In this manner, high potential may be applied across the anode surface either to provide a point-to-point current differential) of less than 20 per cent over a large anode surface, or alternatively, in a desired predetermined pattern to increase plating efficiency, plating speed or deposit uniformity or to produce a controlled non-uniformity. For example, a non-uniform current distribution pattern may be desired to compensate for a variable anode/cathode separation.

The anode assemblies of the present invention have utility in the plating of various metals with electrolytes which would attack the tantalum surface to provide the desired non-conductive inert coating and which processes employ potentials within a range of about 5 to 25 volts. Because of the special demands of high speed tin and chromium plating installations, the anode assemblies of the present invention are particularly advantageously employed therefor.

Use of the anode assemblies in halide ion containing baths should be avoided since these ions will attack the anode assembly. The preferred electrolytes are phenylsulfonic acid and its derivatives, naphthylsulfonic acid and its derivatives, sulfate salts, chromate salts, and other conventional electrolytes which are adapted to provide the desired inert surface compound on the tantalum. In tin and chromium plating, di-hydroxy-di-phenyl sulfonic acid and ethoxylated naphthol sulfonic acid and their derivatives have been found particularly advantageous.

A typical electroplating installation will also include a mixing tank for the electroplating solution for additions of the metal being plated and other makeup ingredients to be added. The electroplating solution is circulated through the mixing tank and filtration apparatus in a substantially continuous fashion. Ideally, the volume of electroplating solution flowing through the tank is maintained substantially constant while variations in thickness of metal deposits are effected by changing the rate of travel of the workpiece through the bath while maintaining constant current density or by changing the applied current with the speed of the workpiece through the bath being held constant.

As an illustration of the advantages of the anode assembly of the present invention, an anode assembly having a working surface of 0.8 by 1.5 meters will exhibit a current flow of 4000 amperes upon application of 25 volt potential. In a plating test, a carbon steel strip 0.1 meter in width transported through an electroplating installation similar to that illustrated in FIG. 8 is found to have a plated deposit of 0.75 to 3.00 micrometers when the speed is varied from 90 to 380 meters per minute. Current efficiencies using such an anode in a tin plating bath are observed at 90 to 97 per cent and the current density is variable from 0.2 to 2.0 kiloamperes per square meter by variation of the applied potential.

Illustrative of the use and advantages of the method of the present invention are the following examples.

EXAMPLE ONE

Tin is electroplated onto a 100 cm. wide carbon steel strip in a 1.5 meter deep tank using platinum-clad tantalum anode assemblies shown in FIGS. 1 and 2. Each assembly has a tantalum mesh base of 1.61 millimeters thickness and a platinum cladding of 6.35 micrometers thickness; the working anode surface is about 0.85 by 1.40 meters. All metal parts of the conductive structural framework and the electrical current distribution subassembly are fabricated of tantalum. The assemblies are constructed to have a maximum variation in electrical emissivity from point-to-point across the anode working surface of 20 per cent.

The anode/cathode distance in the tank is 0.05 meters. Tin is put into solution in a heated mixing tank and the solution is purified and circulated back to the electroplating tank. The plating solution uses ethoxylated naphthol sulfonic acid as the electrolyte. The circulation rate of the electroplating solution is maintained constant at about 1135 liters per minute with the workpiece travel speed being varied from 90 to 1000 meters per minute to vary the thickness of the electrodeposits from 0.75 to 3.0 micrometers. The solution is maintained at a 45°–50°C temperature by chilling as necessary.

Application of a 20 volt potential across the assembly and the workpiece provides a current density on the anode of about 4 kiloamperes per square decimeter. The cathode current efficiency of the bath is found to be about 90°–97 per cent.

Inspection of the anode assembly after a week of usage shows no corrosive action except for the desired inert surface compound on the exposed tantalum.

EXAMPLE TWO

Chromium is electroplated onto carbon steel in the manner indicated in Example One except that a di-hydroxy-di-phenyl sulfonic acid is used as the electrolyte. The platinum-clad tantalum anode assembly operates uniformly and evidences no significant attack after extended usage except the formation of the inert compound upon the surface of the tantalum.

Thus, it can be seen from the foregoing detailed specifications and examples that the present invention uses a large metallic anode assembly which provides superior electrical properties and resists both unwanted corrosion and unwanted formation of inert coatings on its active surfaces. The platinum-clad anode of the present invention has a much longer life in full production operation than a comparable platinum-clad titanium anode (over three times as long), operates at high current densities (about 2–5 kiloamperes per square meter), and has a tantalum substrate which forms its own protective coating to resist the attack of electroplating solution through discontinuities and pinholes in the platinum cladding. Most importantly, in the novel elongated anode assembly, high current is applied to selected points along the length and width of the anodic working surface to maintain a variation in current distribution of less than 20 per cent from point-to-point across the surface, thereby permitting the maintenance of high current density, the use of faster electroplating speeds and the obtaining of more uniform electrodeposits on the workpiece. The light-weight but structurally sound anode assembly of the present invention is particularly useful in the high speed continuous electroplating of carbon steel with tin and chromium.

Having thus described the invention, we claim:

1. A method for the high speed continuous electroplating of an elongated workpiece comprising the steps of:

providing an electroplating tank adapted to permit the flow therethrough of electroplating solution and the movement therethrough of an elongated workpiece;

circulating through said electroplating tank an electroplating solution containing ions of a metal to be plated and an electrolyte forming an inert coating upon tantalum;

transporting any elongated workpiece through said electroplating solution with said electroplating tank;

maintaining adjacent said workpiece within said electroplating solution at least one anode assembly including an elongated tantalum mesh clad with platinum on the surface thereof adjacent said workpiece, an elongated electrically conductive framework supporting and conductively bonded to said mesh on the other surface thereof, and a current distribution subassembly generally insulated from said framework but selectively conductively bonded thereto at a plurality of spaced points intermediate the ends of said framework; and applying a potential between said workpiece and said anode assembly to provide a uniform current distribution with variations of less than 20 per cent across said mesh surface and thereby to electroplate the metal ion of said electroplating solution onto said workpiece.

2. The method of claim 1 wherein said workpiece is transported through said electroplating solution at a rate of about 90 to 1000 meters per minute and wherein said applied potential is about 5 to 25 volts; and wherein said electroplating solution within said electroplating tank is about 45° to 50° C.

3. The method of claim 1 wherein at least one pair of said anode assemblies are provided and disposed parallel to said workpiece, and said workpiece is transported therebetween.

4. The method of claim 1 wherein a current density of about 0.2 to 30 kiloamperes per square meter is maintained upon the workpiece.

5. The method of claim 1 wherein said electroplating solution is comprised of metallic ions selected from the group consisting of tin, chromium and mixtures thereof, and electrolytes selected from the group consisting of phenyl sulfonic acids, naphthyl sulfonic acids, sulfate salts and chromate salts.

6. The method of claim 1 wherein said workpiece is fabricated from carbon steel, said electroplating solution includes metal ions selected from the group consisting of tin ions, chromium ions and mixtures thereof, and an electrolyte selected from the group consisting of ethoxylated naphtol sulfonic acid and di-hydroxy-diphenyl sulfonic acid.

* * * * *